United States Patent
Böckmann et al.

(10) Patent No.: US 6,503,171 B1
(45) Date of Patent: Jan. 7, 2003

(54) METHOD FOR THE CONTROL OF A TRANSMISSION

(75) Inventors: Gerhard Böckmann, Laatzen (DE); Andreas Böhm, Wennigsen (DE)

(73) Assignee: WABCO GmbH & Co. oHG, Hannover (DE)

(*) Notice: Subject to any disclaimer, the term of this patent is extended or adjusted under 35 U.S.C. 154(b) by 28 days.

(21) Appl. No.: 09/685,389

(22) Filed: Oct. 10, 2000

(30) Foreign Application Priority Data

Oct. 12, 1999 (DE) .......................... 199 48 992

(51) Int. Cl.⁷ .......................... B60K 41/04; B60K 41/20
(52) U.S. Cl. .......................... 477/107; 477/110
(58) Field of Search .......................... 477/107, 109, 477/110

(56) References Cited

U.S. PATENT DOCUMENTS

| | | | |
|---|---|---|---|
| 4,787,044 A | * 11/1988 | Nagata et al. | 364/31.07 |
| 5,425,689 A | * 6/1995 | Genise | 477/120 |
| 5,679,093 A | * 10/1997 | Desautels et al. | 477/109 |
| 5,729,454 A | * 3/1998 | Amsallen | 364/424.08 |
| 5,984,828 A | * 11/1999 | Huber | 477/78 |

FOREIGN PATENT DOCUMENTS

| | | |
|---|---|---|
| DE | 4446120 | 7/1995 |
| DE | 19544516 | 6/1997 |
| DE | 19717042 | 10/1998 |
| EP | 0670440 | 12/1994 |
| EP | 0641958 | 3/1995 |
| EP | 0670440 | 9/1995 |
| EP | 0925990 | 6/1999 |
| EP | 1013973 | 6/2000 |
| FR | 2431642 | 2/1980 |

* cited by examiner

*Primary Examiner*—Charles A Marmoh
*Assistant Examiner*—Eric M. Williams
(74) *Attorney, Agent, or Firm*—Proskauer Rose LLP

(57) ABSTRACT

A method for controlling a transmission of an engine-driven vehicle having a plurality of gears, the vehicle including a service module actuable by a driver of the vehicle to select a desired gear, the service module being connected to a transmission control system which automatically changes gears in response to actuation of the service module, the vehicle further including an engine braking system connected to the transmission control system which is actuable to brake the vehicle engine during a gear change, the method comprising: monitoring the transmission input rotational speed ($N_E$) and the transmission output rotational speed ($N_A$); calculating a synchronous rotational speed ($N_E$) of the desired gear; actuating the engine braking system to reduce the rotational input speed ($N_E$) and synchronize it with the synchronous rotational speed ($N_S$) so that the desired gear change can be effected; and disabling the engine braking system when a predetermined switch-off threshold is reached at a point in time before an expected synchronization of the rotational speeds ($N_E$) and ($N_S$) occurs. In one preferred embodiment, the engine braking system is disabled when the difference ($D_A$) between rotational speeds ($N_E$) and ($N_S$) becomes equal to or less than a predetermined rotational differential value ($D_A$). In another preferred embodiment, the engine braking system is disabled at a point in time which precedes the expected time of synchronization by fixed delay time ($T_A$) which is typical for the engine braking system. By disabling the engine braking system before synchronization of the rotational speeds ($N_E$) and ($N_S$) actually occurs, the method accounts for hysteresis effects and the process of changing gears is speeded up.

2 Claims, 4 Drawing Sheets

METHOD FOR THE CONTROL OF A TRANSMISSION

BACKGROUND OF THE INVENTION

The invention relates to a method for the control of a transmission in a vehicle having a service module actuable by a driver of the vehicle to select a desired gear, wherein the service module is connected to an automatic transmission control system which switches gears as a result of the driver's actuation of the service module.

A method of this type is known from EP 0,670,440 B1 (corresponding to U.S. Pat. No. 5,425,689 which is incorporated herein by reference).

The known method serves to control a manually switchable, non-synchronized vehicle transmission of conventional design having a plurality of gears, which is operated in a partially automated manner by means of an electronic control system for the transmission (hereinafter referred to as a transmission control system), and by means of an electrical and pneumatic actuating system connected to same. Automation consists in that the mechanical movements required for a gear change are made by the electrical and pneumatic actuating system as a result of triggering signals from the transmission control system.

In a gear change controlled by the transmission control system, it is desirable for the gear change to be as rapid as possible in order to make full drive capacity available to the vehicle once more. Especially when changing gears in the direction of a higher gear ratio, i.e., when upshifting, the problem occurs that the relatively high engine rpm's must be reduced to a suitable lower rotational speed suitable for engagement of the new gear with higher gear ratio. In order to speed up this process, according to the aforementioned prior art, an engine braking device is actuated when a gear is changed in the direction of a greater gear ratio, thereby contributing to a more rapid reduction of the engine rpm's.

However, this method is not entirely satisfactory for speeding up gear engagement because engine braking devices of conventional design have a certain delay in response as they are switched on or off. This may result in an undesirably long actuating time for the engine braking device and therefore to an undesired lengthy gear changing process.

The present invention has as its object to propose a method for the control of a transmission which makes rapid gear changes possible through a more efficient utilization of an engine braking device.

SUMMARY OF THE INVENTION

A method for controlling a transmission of an engine-driven vehicle having a plurality of gears, the vehicle including a service module actuable by a driver of the vehicle to select a desired gear, the service module being connected to a transmission control system which automatically changes gears in response to actuation of the service module, said vehicle further including an engine braking system connected to said transmission control system which is actuable to brake the vehicle engine during a gear change, the method comprising: monitoring a transmission input rotational speed ($N_E$) and a transmission output rotational output speed ($N_A$) of the transmission; determining a synchronous rotational speed ($N_S$) at which a gear change can be effected; actuating the engine braking system to reduce the transmission input rotational speed ($N_E$) and synchronize it with the synchronous rotational speed ($N_S$) so that the desired gear change can be effected; and disabling the engine braking system at a point in time before the expected synchronization of the rotational speeds ($N_E$) and ($N_S$) occurs. In one preferred embodiment, the engine braking system is disabled at a point in time when the difference between the transmission rotational input speed ($N_E$) and the synchronous rotational speed ($N_S$) becomes equal to or less than a predetermined rotational differential value. In another preferred embodiment, the engine braking system is disabled at a point in time which precedes the expected synchronization of the rotational speeds ($N_E$, $N_S$), by a fixed delay time ($T_A$) which is typical for the engine braking system.

The invention has the advantage to be easily implemented without any need for employing additional sensors. The invention can be implemented simply by using sensors which are already present for a transmission control system and by simply adding a few program steps to the control program already running in the transmission control system.

In an advantageous further development of the invention, the vehicle acceleration or the vehicle deceleration is taken into account in determining the switch-off threshold of the engine braking device. This has the advantage that the invention can be used in a flexible manner with many different kinds of vehicle models and under different road conditions, for example, for mountain travel.

In another advantageous further development, the switch-off threshold following the switching off of the engine braking device is determined automatically by measuring the switch-off delay. This has the advantage that the switch-off threshold or the switch-off delay need not be determined separately for every vehicle by measurement to be then stored in the transmission control system.

It is a further advantage that as a result of the inventive method, influences which could lead to a modification of the typical value of the switch-off delay period, such as temperature influences, automatically lead to an adaptation of the switch-off threshold and thus further reduce the duration of a shifting process.

BRIEF DESCRIPTION OF THE DRAWINGS

The invention is explained below in further detail through the utilization of drawings, wherein.

DETAILED DESCRIPTION OF PREFERRED EMBODIMENTS OF THE INVENTION

The same reference numbers are used in the figures for the same parts and signals.

Figure 1:
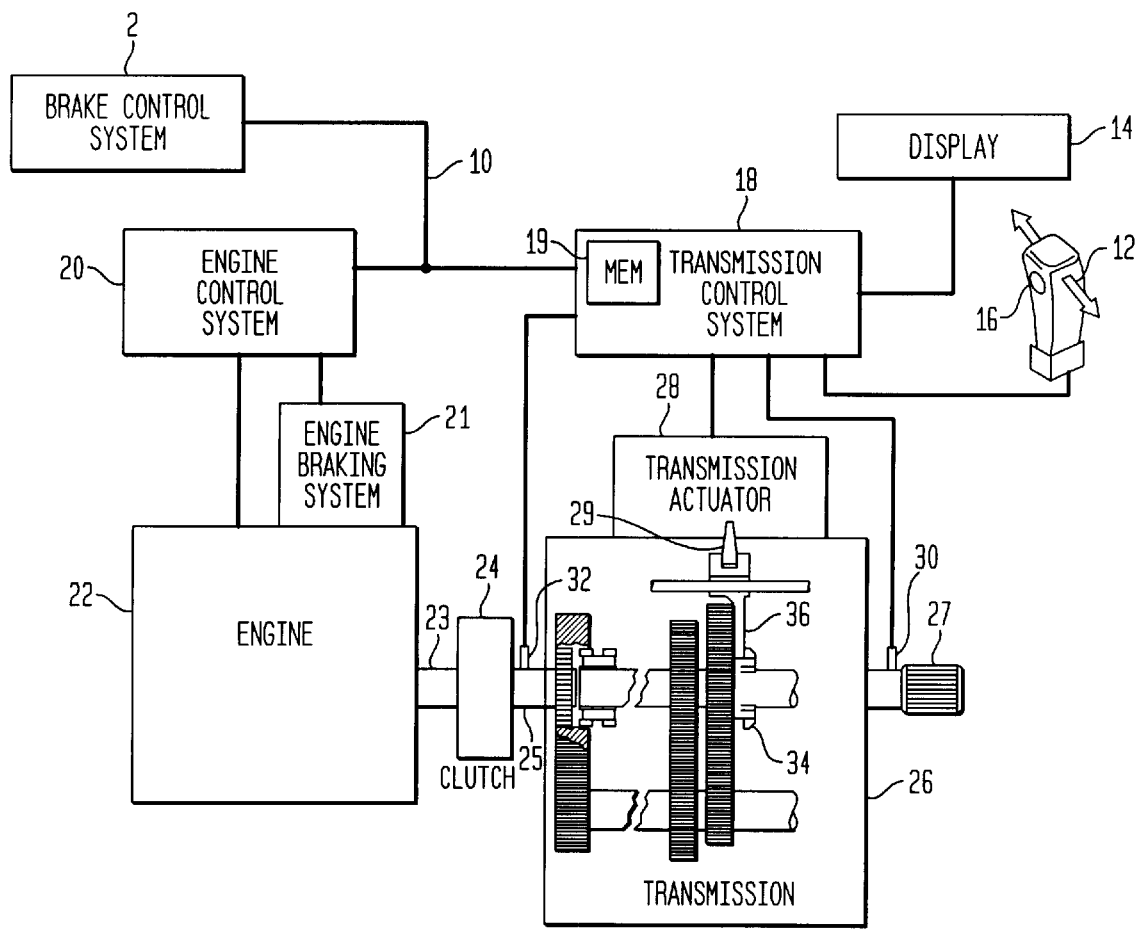
FIG. 1 shows a vehicle transmission wherein the inventive method according to the invention is carried out.

The system shown in FIG. 1 comprises an engine (22) serving to drive a vehicle in which the system shown is used to carry out the inventive method. The engine (22) transmits its drive force in the form of torque via engine drive shaft (23) to a clutch (24) of known design. The clutch (24) can be placed by the driver of the vehicle in an open (disengaged) or closed (engaged) state by means of a pedal (not shown). Without actuation of the pedal, the clutch is closed (engaged), whereas the clutch is opened (disengaged) when the pedal is actuated. In its closed state, the clutch (24) transmits the torque of the engine drive shaft (23) to a transmission drive shaft (25). When the clutch is opened, this torque is not transmitted to the transmission drive shaft (25).

The transmission (26) is used to transmit the torque from the transmission drive shaft (25) to a transmission output shaft (27) with a variable gear ratio. The transmission output shaft (27) is connected via additional parts (not shown), such as, e.g., an additional shaft, a cardan joint, a differential gear, etc., to the drive wheels of the vehicle.

The transmission (26) has a plurality of gears (unnumbered) which can be brought alternately into engagement with each other for the selection of a desired gear ratio. Mechanical transmission elements (34, 36) are provided through which the gears can be shifted in order to select the gear ratio or the combination of gears. The mechanical transmission elements (34, 36) are moved by means of an electrically actuated transmission actuator (28) acting through a gear-shifting finger (29). The transmission actuator (28) may be provided with servo devices equipped with electric motors (not shown). In a preferred embodiment of the invention, the transmission actuator (28) is provided with adjusting cylinders (not shown) actuated by a pressure medium which can be supplied via solenoid valves (not shown) with changing pressure from a pressure medium source, e.g., a compressed-air container (not shown).

To control the transmission functions, the transmission actuator (28) is connected via electrical lines to a transmission control system (18). The transmission control system (18) is furthermore connected to rotational speed sensors (30, 32) which supply information on the input transmission speed, i.e., the rotational speed of the transmission drive shaft (25), and the transmission output speed, i.e., the rotational speed of the transmission output shaft (27), to the transmission control system (18).

Furthermore, the transmission control system (18) is connected to a service module (12, 16) equipped with a service lever (12) and a neutral switch (16) preferably located on the service lever (12). The driver of the vehicle is able to inform the transmission control system (18) by means of the service module (12, 16) of the gear to be selected. In a preferred embodiment of the invention, the transmission (26) is shifted up by one gear by moving the service lever (12) forward, while a movement of the service lever (12) rearward shifts the transmission (26) down by one gear. Actuation of the neutral switch (16) shifts the transmission (26) into a neutral position, i.e., no gear is engaged.

The transmission control system (18) is connected via a data bus (10) to other control devices provided in the vehicle, e.g., to engine control system (20) and engine brake control system (21), for the exchange of data. The transmission control system (18) can inform the engine control system (20) through suitable data messages that a certain engine speed, for example, is to be selected for a gear change, or that engine braking system (21) is to be actuated. Through other data messages, the transmission control system (18) can, for example, receive information from the brake control system (2) on certain vehicle data such as, e.g., the vehicle mass.

To switch the engine braking system (21) on or off, the transmission control system (18) transmits a target actuation state ($B_{soll}$) for the engine braking system (21) through a data message to the engine control system (20). In a further data message, the transmission control system (18) receives an answer from the engine control system (20) of the actual actuation state ($B_{ist}$) of the engine braking system (21).

The transmission control system (18) is furthermore connected to a display arrangement (14) which is preferably within the field of vision of the driver, on which certain information can be displayed, e.g., the gear selected by the driver by means of the service module (12, 16) or the gear to be selected or already engaged. Furthermore, a non-volatile memory (19) is located in the transmission control system (18).

The engine (22) is furthermore directly connected to the engine control system (20) in order to control various engine functions, e.g., the control of rotational speed, regulation of fuel supply, regulation of pollutant emissions, switching the engine braking system (21) on and off, etc.

The transmission control system (18), the engine control system (20) and the brake control system (2) are preferably in the form of electronic control devices. They can also be integrated into a single control device.

Figure 2:
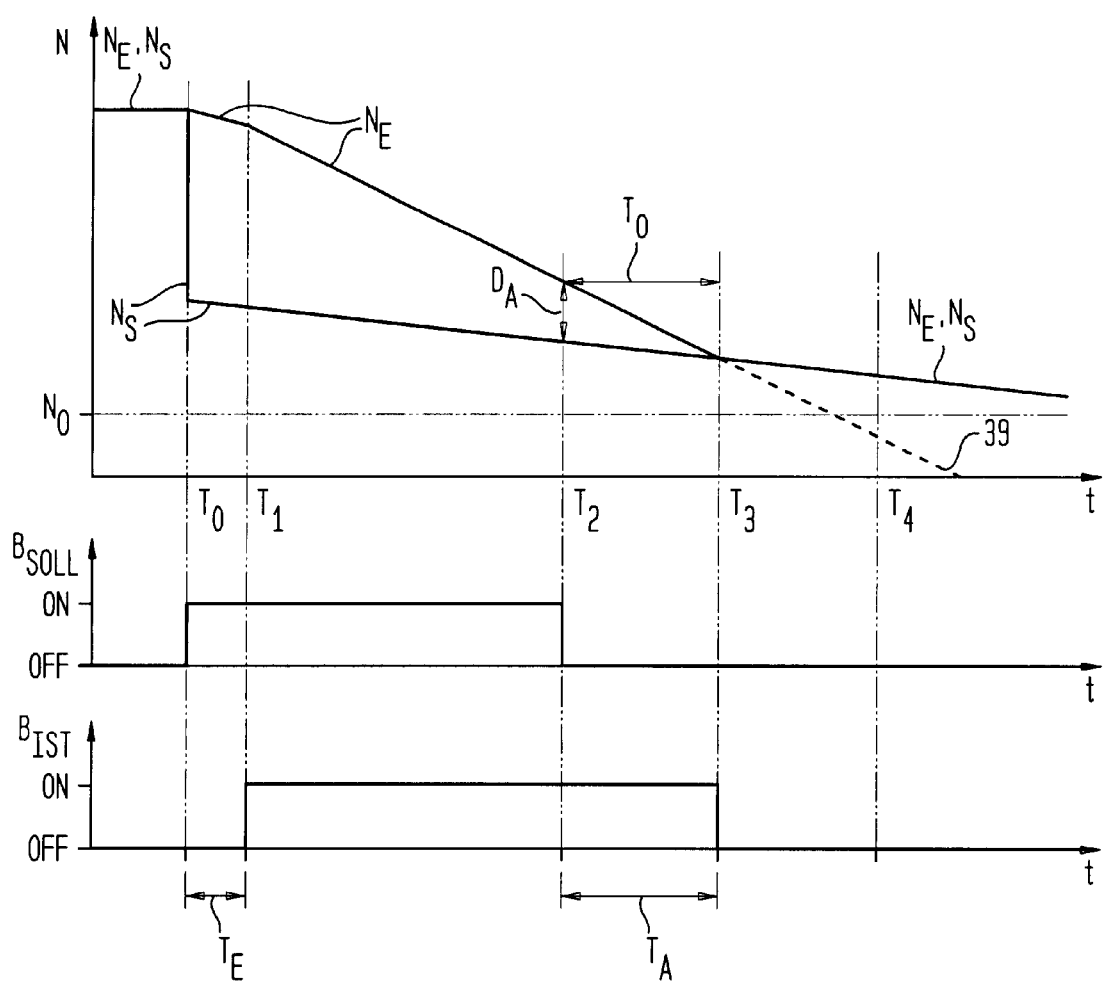
FIG. 2 shows the timing evolution of the method according to the invention.

FIG. 2 shows the evolution with time of rotational speeds (N) and of switching signals of the engine braking system (21) in separate diagrams. In the rotational speed diagram (at the top), the rotational speed of the transmission input ($N_E$) which is equal to the engine speed when the clutch is closed is shown, as well as the so-called synchronous rotational speed ($N_S$). The synchronous rotational speed is calculated as a product of the rotational speed of the transmission output ($N_A$) and the gear ratio (G) of the selected or desired gear, as appears from the following equation:

$$N_S = N_A * G \quad [1]$$

The synchronous rotational speed ($N_s$) is the speed that the transmission input shaft (25) would have if the desired gear would have been already inserted.

The transmission output speed ($N_A$) can also be determined from the vehicle speed when the gear ratio of the drive differential is known. For this reason, a rotational speed sensor on the transmission output can be omitted when the information on the vehicle speed is available.

In the lower two diagrams of FIG. 2, the target actuation state ($B_{soll}$) and the actual actuation state ($B_{ist}$) of the engine braking system (21) are shown as signals with the states ON and OFF. The switch-on delay ($T_E$) and the switch-off delay ($T_A$) can be seen as the time delay between the two signals ($B_{soll}$, $B_{ist}$). The synchronous rotational speed ($N_s$) is always the same as the engine rotational speed and the transmission input rotational speed ($N_E$) when the clutch (24) is closed and a gear has been selected. As soon as the transmission is shifted to the neutral position, i.e., when no gear has been selected, the synchronous rotational speed ($N_s$) is determined in the transmission control system (18) on the basis of the gear ratio (G) which applies upon selection of that gear desired by the driver. During shifting, the clutch (24) is kept in the closed position.

Solid lines in FIG. 2 show the evolution of the rotational speeds ($N_E$, $N_S$) during a gear change when using the inventive method, while broken line (39) shows the theoretical evolution of rotational speed ($N_E$) without utilization of the invention. The horizontal broken line designated $N_0$ represents the engine speed at idle. The rotational speeds ($N_E$, $N_S$) are not allowed to fall short of $N_0$. The vertical broken lines serve to mark off certain points in the time evolution.

During the time before point in time ($T_0$), the vehicle is in a travel state with uniform travel speed, wherein the engine rpm's is relatively high. The clutch (24) is closed, and a gear is engaged so that the rotational speeds ($N_E$, $N_S$) are equal. At point in time ($T_0$) the transmission control system (18) starts to carry out a gear change into a gear with a higher gear ratio which has been selected by the driver through the service module (12).

At the point in time ($T_0$) the transmission is shifted in its neutral position. From this moment on the vehicle is no longer subjected to any driving torque so that its speed decreases, especially when driving on a rising road. Analogous with the vehicle speed, the computed synchronous rotational speed ($N_s$) of the new gear decreases in the transmission control system (18).

Since the clutch (24) is kept closed, the transmission input speed ($N_E$) decreases in the same manner as the engine speed with an engine-specific speed gradient. Upon actuating the engine braking system (21), a shift is made from a first engine-specific speed gradient to a second, greater engine-specific speed gradient at time ($T_1$), and thereby synchronization between the rotational speeds ($N_E$, $N_S$) is speeded up. The actuation of the engine braking system (21) takes place at the point in time ($T_0$) by emitting a switch-on signal ($B_{soll}$=ON). The action of the engine braking system (21) starts to take effect at point in time ($T_1$), and this is illustrated in FIG. 2 by the change in slope of the line labeled $N_E$ which occurs at time ($T_1$), i.e., between the point in time ($T_0$) and the point in time ($T_1$), the first speed gradient is in effect in decreasing the magnitude of $N_E$, and as of point in time ($T_1$) the second speed gradient is in effect in decreasing the value of $N_E$.

It is possible to shift into the gear desired by the driver only when a synchronization between the rotational speeds ($N_E$, $N_S$) has been reached. This happens in the drawing of FIG. 2 at the point in time ($T_3$) where $N_E$ and $N_S$ converge. To complete the gear change as quickly as possible, i.e., at the point in time ($T_3$), the engine braking system (21) must be disabled at this point in time, i.e., the actual actuation state ($B_{ist}$) should be equal to OFF at point in time ($T_3$). For this to occur, the transmission control system (18) takes into account a specific switch-off delay ($T_A$) between $B_{soll}$ and $B_{ist}$. It is possible for the transmission control system (18) to take into account switch-off delay ($T_A$) by calculating the point in time ($T_3$) from a linear extrapolation of the evolution in time of the rotational speeds ($N_E$, $N_S$), and by subtracting the switch-off delay ($T_A$) from that point in time. The point in time ($T_3$) of the synchronization can be estimated from point in time ($T_1$) at every point in time (t), preferably according to the following equation:

$$T_3 = t + \frac{N_E(t) - N_S(t)}{\dot{N}_E(t) - \dot{N}_S(t)} \quad [2]$$

The value (t) represents here the time, i.e., starting at the current time (t), the point in time ($T_3$) occurs at a time in the future which can be calculated from the values ($N_E(t)$, $N_S(t)$, $\dot{N}_E(t)$, $\dot{N}_S(t)$). The values ($N_E(t)$, $N_S(t)$, $\dot{N}_E(t)$, $\dot{N}_S(t)$) used in this equation are the momentary values of ($N_E$, $N_S$, $\dot{N}_E$, $\dot{N}_S$) at the point in time (t).

Another advantageous manner for the determination of a switch-off point of time for switching off of the engine braking system (21) ($B_{soll}$=OFF) which will be explained in further detail below, consists in monitoring the rotational speeds ($N_E$, $N_S$) and in emitting a signal to switch off the engine braking system (21) when a predetermined rotational-speed differential value ($D_A$) has been reached. To sum up, the time of synchronization can be estimating using either a time value ($T_A$) representing a switch-off delay, or a rotational speed differential value ($D_A$).

The utilization of a calculated rotational speed differential value ($D_A$) as a switch-off threshold is now described. The rotational speed differential value ($D_A$) may be calculated according to the equation:

$$D_A = D_0 * (1 - \dot{N}_S/\dot{N}_E) \quad [3]$$

The value ($D_0$) represents a specific rotational speed differential value for the applicable engine braking system which is determined from the switch-off delay ($T_A$) multiplied by the second engine-specific rotational speed gradient ($\dot{N}_E$), while the synchronous rotational speed ($N_S$) remains unchanged:

$$D_0 = T_A * \dot{N}_E \quad [4]$$

The transmission control system (18) then emits a signal for switching off of the engine braking system (21) at the point in time ($T_2$) when the actual difference between the rotational speed values ($N_E$, $N_S$) reaches the calculated rotational-speed differential value ($D_A$). Thus, at point in time ($T_3$), the engine braking system (21) reaches its inactive state ($B_{ist}$=OFF).

If the signal to switch off the engine braking system (21) had not been emitted already at the point in time ($T_2$) but only at point in time ($T_3$), the engine braking system (21) would have assumed the inactive state only at point in time ($T_4$), i.e., at point in time ($T_3 + T_A$). As can be seen in FIG. 2 from the broken lines, the transmission input speed ($N_E$) or the engine speed would then already be well below the synchronous rotational speed ($N_S$) and, in the present example, even below the engine idling speed ($N_0$). As a result, the gear shifting process would have been prolonged in an undesirable manner on the one hand, and on the other hand, the engine would have been operated in an unacceptable operating state.

Figure 3:
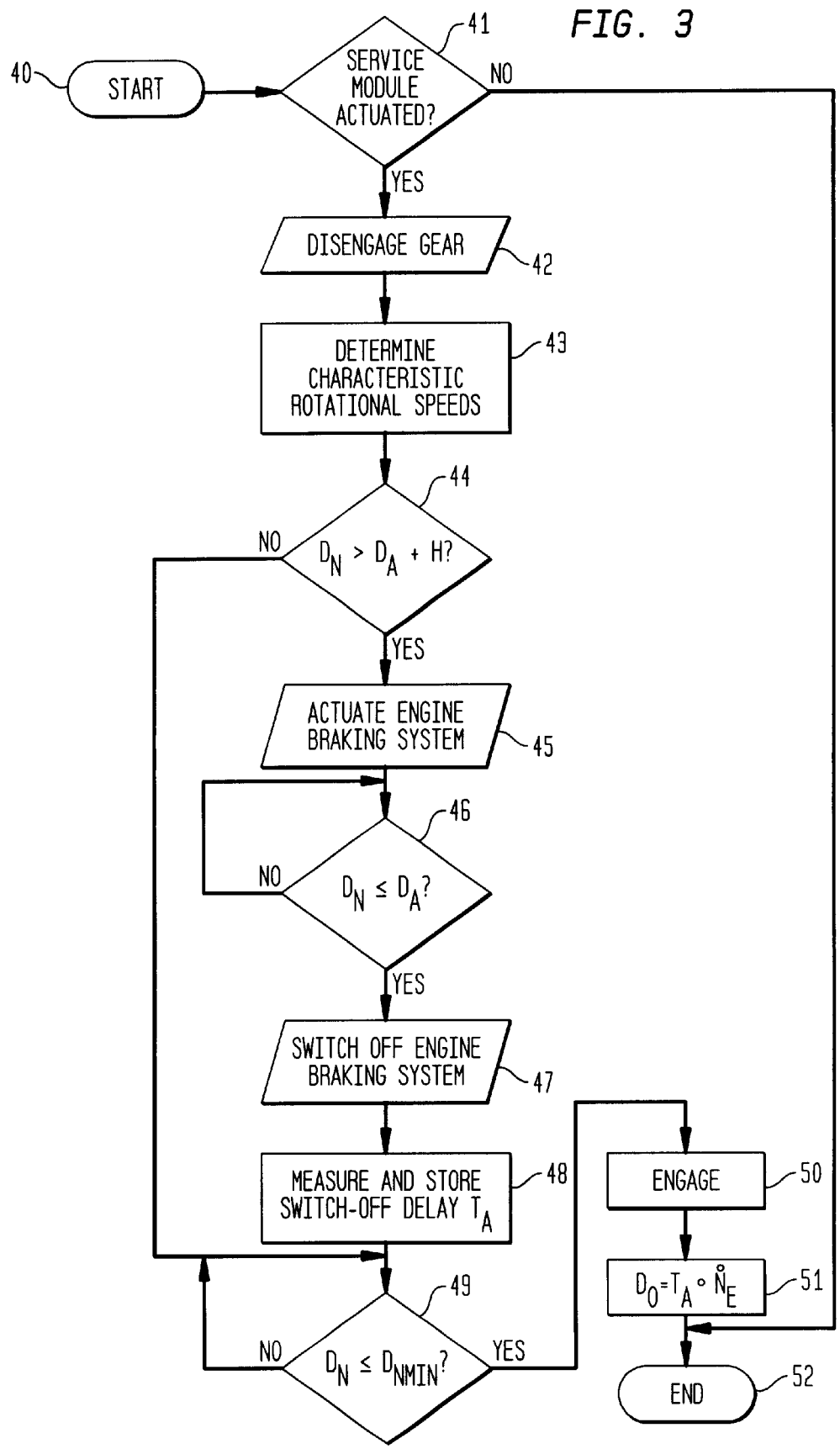
FIGS. 3 and 4 show flow charts of a program for carrying out the inventive method.

FIG. 3 shows an implementation of the inventive method in the form of a flow chart of a program. The process starts with block (40). In the following decision block (41), the program checks whether the service module (12, 16) has been actuated for the purpose of shifting gears. If this is not the case, the process ends immediately at block (52).

In the alternative, the program continues with a data transfer block (42) in which a signal is transmitted to the transmission actuator (28) following which the currently selected gear is disengaged. This corresponds to point in time ($T_0$) according to FIG. 2. Following this a sub-program block (43) is called up in which the characteristic rotational speed values are determined. The sub-program block is shown in greater detail in FIG. 4.

Figure 4:
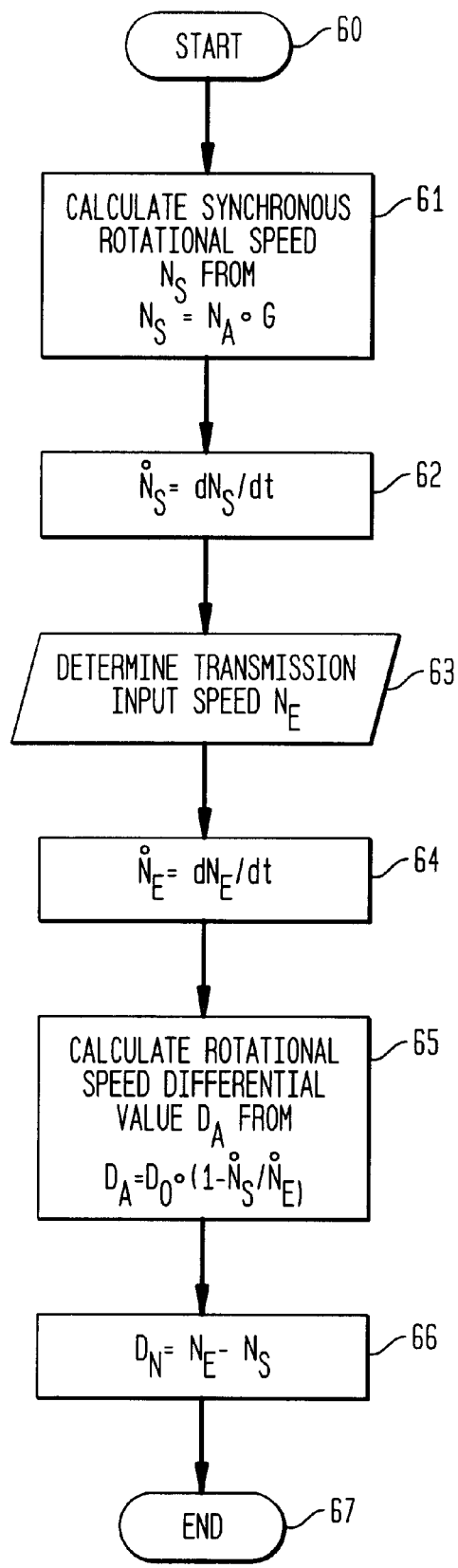

Referring to FIG. 4, the sub-program block (43) starts at block (60). The program then continues with a processing block (61) in which the synchronous rotational speed ($N_S$) is calculated according to equation [1]. The time derivative ($\dot{N}_S$) of the synchronous rotational speed ($N_S$) is then calculated in processing block (62). The time derivative ($\dot{N}_S$) corresponds to the slope of the straight line designated ($N_S$) in FIG. 2 at point in time ($T_0$).

The transmission input speed ($N_E$) is then calculated in data transfer block (63), e.g., by evaluating the signal from the rotational-speed sensor (32) or by receiving rotational-speed information from the engine control system (20) via the data bus (10). In processing block (64), the time derivative ($\dot{N}_E$) of the transmission input speed ($N_E$) is then calculated. The time derivative ($\dot{N}_E$) corresponds to the slope of the segments of the straight line designated ($N_E$) in FIG. 2 beginning at point in time ($T_0$), i.e., the previously mentioned first and second rotational speed gradients of the engine. Alternatively, instead of calculating the time derivative ($\dot{N}_E$) it is also possible to utilize a predetermined value stored in the transmission control system (18), e.g., in the memory (19), which represents a measure of the typical second rotational speed gradient which occurs when the engine braking system (21) is switched on at point in time $T_2$.

Using equation [3], the rotational speed differential value ($D_A$) is then calculated in processing block (65) and is subsequently used as a criterion for switching on and off the engine braking system (21). Furthermore, the current difference ($D_N$) between the rotational speeds ($N_E$, $N_S$) is calculated in processing block (66). The sub-program block (43) then ends with block (67).

The program then continues with the decision block (44) shown in FIG. 3. Here the program checks whether the current difference ($D_N$) between the rotational speeds ($N_E$, $N_s$) exceeds the rotational differential value ($D_A$) enlarged by a hysteresis value (H). The hysteresis value serves to avoid any unnecessary switching on and off of the engine braking system (21) and toggling between the states ON and OFF when the current difference ($D_N$) is close to the rotational differential value ($D_A$). In this case, i.e., when the rotational speed differential value ($D_A$) increased by the hysteresis value H is not exceeded, an actuation of the engine braking system (21) is not indicated, so that the program branches off directly to the decision block (49) by skipping the blocks (45, 46, 47, 48).

Otherwise the program continues to data transfer block (45) where a data message is transmitted to the engine control system (20) by means of which the engine braking system (21) is actuated ($B_{soll}$=ON). The engine braking system (21) then becomes actuated at point in time ($T_1$) ($B_{ist}$=ON).

The hysteresis value (H) must be selected for the current application through tests. In any case, it should be selected so that an actuation of the engine braking system (21) does not take place when it is expected, in view of the sum of the switch-on delay ($T_E$) and of the switch-off delay ($T_A$) that an actuation of the engine braking system (21) does not lead to a more rapid synchronization between these rotational speeds due to an already relatively small rotational speed difference between the rotational speeds ($N_E$, $N_S$).

In a following decision block (46), a verification is made continuously whether the current difference ($D_N$) between the rotational speeds ($N_E$, $N_S$) reaches or fails to reach the calculated rotational differential value ($D_A$). As soon as this is ascertained, the program continues with the data transfer block (47) in which a data message is transmitted to the engine control system (20) to switch off the engine braking system (21) ($B_{soll}$=OFF).

In another program block (48), the switch-off delay ($T_A$) is measured by evaluating the points in time when the target actuation state ($B_{soll}$) of the engine braking system (21) changes from the state ON to the state OFF (point in time $T_2$), and the actual actuating state ($B_{ist}$) changes from the state ON to the state OFF (point in time $T_3$). For this purpose, the transmission control system (18) stores the points in time ($T_2$, $T_3$) and determines the switch-off delay ($T_A$) as the difference between the points in time ($T_2$, $T_3$), e.g., in an interrupt program.

A continuous check is then conducted in a decision block (49) to verify whether a synchronization of the rotational speeds ($N_E$, $N_S$) has taken place. The synchronization is considered to have taken place if the current difference ($D_N$) between the speeds ($N_E$, $N_S$) is less than the amount of a minimum differential value ($D_{Nmin}$). The minimum differential value ($D_{nmin}$) is preferably set to 10 to 40 rotations per minute. When synchronization has taken place, the selected gear is then engaged in a block (50) through the emission of suitable signals to the transmission actuator (29).

Finally, the value ($D_0$) is determined in a processing block (51) according to equation [4], as explained earlier. When the transmission control system (18) is started up before the first utilization of the engine braking system (21), e.g. after switching on the ignition, suitable replacement values typical for the vehicle and which are preferably stored in the memory (19) are then used for the values ($D_0$, $T_A$, $N_E$) which cannot yet be determined precisely.

The process then ends with block (52).

Having described preferred embodiments of the invention with reference to the accompanying drawings, it is to be understood that the invention is not limited to these precise embodiments, and that various changes and modifications may be effected therein by one skilled in the art without departing from the scope or spirit of the invention as defined in the appended claims.

What is claimed is:

1. A method for controlling a transmission of an engine-driven vehicle having a plurality of gears, the vehicle including a service module actuable by a driver of the vehicle to select a desired gear, the service module being connected to a transmission control system which automatically changes gears in response to an actuation of the service module, said vehicle further including an engine braking system connected to said transmission control system which is actuable to brake the vehicle engine during a gear change, the method comprising:

monitoring a transmission input rotational speed ($N_E$) and a transmission output rotational speed ($N_A$);

calculating a synchronous rotational speed ($N_S$) of the desired gear;

actuating said engine braking system to reduce the transmission input rotational speed ($N_E$);

determining a switch-off threshold for disabling said engine braking system at a point in time before an expected synchronization of the rotational speeds ($N_E$) and ($N_S$) occurs:

disabling said engine braking system when said predetermined switch-off threshold is reached; and synchronizing said transmission input rotational speed ($N_E$) with said synchronous rotational speed ($N_S$) so that said gear change can be effected, wherein said predetermined switch-off threshold is a predetermined rotational differential value ($D_A$) between the rotational speeds ($N_E$) and ($N_S$), wherein said predetermined speed differential value ($D_A$) is determined according to the equation:

$$D_A = D_0 * (1 - \dot{N}_S / \dot{N}_E)$$

wherein $D_0$ is a vehicle-specific rotational differential value, and the values ($\dot{N}_E$) and ($\dot{N}_S$) are the time derivatives of the transmission rotational input speed ($N_E$) and the synchronous rotational speed ($N_S$) respectively, and wherein the synchronous rotational speed ($N_S$) is determined by the product of the transmission rotational output speed ($N_A$) multiplied by the gear ratio (G) of the desired gear.

2. The method of claim 1 wherein the vehicle-specific rotational differential value ($D_0$) is defined as the product of a switch-off delay ($T_A$) typical for the engine braking system, and a rotational speed gradient ($\dot{N}_E$) of the rotational speed ($N_E$) typical of the engine when the engine braking system is actuated.

* * * * *